US012665815B2

(12) United States Patent
Ben Slimen et al.

(10) Patent No.: US 12,665,815 B2
(45) Date of Patent: Jun. 23, 2026

(54) METHOD FOR DETECTING ANOMALIES IN A COMMUNICATION NETWORK, METHOD FOR COORDINATING ANOMALY DETECTION, CORRESPONDING DEVICES, ROUTER EQUIPMENT, ANOMALY MANAGEMENT SYSTEM AND COMPUTER PROGRAMS

(71) Applicant: ORANGE, Issy-les-Moulineaux (FR)

(72) Inventors: Yosra Ben Slimen, Chatillon Cedex (FR); Hichem Sedjelmaci, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 590 days.

(21) Appl. No.: 18/007,928

(22) PCT Filed: Jun. 3, 2021

(86) PCT No.: PCT/FR2021/051009
§ 371 (c)(1),
(2) Date: Dec. 2, 2022

(87) PCT Pub. No.: WO2021/245361
PCT Pub. Date: Dec. 9, 2021

(65) Prior Publication Data
US 2023/0291752 A1 Sep. 14, 2023

(30) Foreign Application Priority Data
Jun. 4, 2020 (FR) ....................................... 2005833

(51) Int. Cl.
*H04L 41/14* (2022.01)
*G06N 3/09* (2023.01)
(Continued)

(52) U.S. Cl.
CPC ............. *H04L 41/145* (2013.01); *G06N 3/09* (2023.01); *G06N 3/092* (2023.01);
(Continued)

(58) Field of Classification Search
None
See application file for complete search history.

(56) References Cited

U.S. PATENT DOCUMENTS 10,931,692 B1* 2/2021 Mota ...................... G06N 20/00
2015/0324582 A1* 11/2015 Vasseur ............... H04W 12/121
726/23
(Continued)

FOREIGN PATENT DOCUMENTS

WO WO-2019129915 A1 * 7/2019 ......... H04L 63/1408
WO WO-2019145049 A1 * 8/2019 .......... G06F 11/3006

OTHER PUBLICATIONS

International Search Report dated Sep. 21, 2021 for corresponding International Application No. PCT/FR2021/051009, filed Jun. 3, 2021.
(Continued)

*Primary Examiner* — Philip J Chea
*Assistant Examiner* — Bin Qing Zheng
(74) *Attorney, Agent, or Firm* — David D. Brush; Westman, Champlin & Koehler, P.A.

(57) ABSTRACT

A method for detecting anomalies in a telecommunications network. The method includes implementing, by a first anomaly detection module: obtaining a plurality of first measurement data representing a resource usage of the network at a given time at a level of a target element; determining from the first measurement data at least one anomaly category from a plurality of anomaly categories a presence of attack, a presence of a fault and an absence of anomaly; requesting validation of the determined category
(Continued)

to a second attack detection module and/or to a third fault detection module, depending on the determined anomaly category, the request including at least at the given time, an identifier of the target item, the determined anomaly category and the first measurement data; and on receipt of a response from the second and/or third module, deciding on a processing action to trigger in the network according to the response.

17 Claims, 6 Drawing Sheets

(51) Int. Cl.
    *G06N 3/092*       (2023.01)
    *H04L 9/40*         (2022.01)
    *H04L 41/0631*    (2022.01)
    *H04L 41/0654*    (2022.01)
    *H04L 41/16*      (2022.01)
    *H04L 41/40*      (2022.01)
    *H04L 43/04*      (2022.01)
(52) U.S. Cl.
    CPC ...... *H04L 41/0631* (2013.01); *H04L 41/0654* (2013.01); *H04L 41/16* (2013.01); *H04L 43/04* (2013.01); *H04L 63/0227* (2013.01); *H04L 63/1416* (2013.01); *H04L 63/1425* (2013.01); *H04L 41/40* (2022.05)

(56) References Cited

U.S. PATENT DOCUMENTS

2016/0352766 A1*  12/2016  Flacher ................... H04L 12/28
2019/0058715 A1*   2/2019  Abbaszadeh ....... H04L 63/1416
2020/0136890 A1*   4/2020  To ....................... H04L 43/0852

OTHER PUBLICATIONS

Written Opinion of the International Searching Authority dated Sep. 21, 2021 for corresponding International Application No. PCT/FR2021/051009, filed Jun. 3, 2021.
English translation of the Written Opinion of the International Searching Authority dated Sep. 21, 2021 for corresponding International Application No. PCT/FR2021/051009, filed Jun. 3, 2021.
Arturo Servin et al., "Multi-agent Reinforcement Learning for Intrusion Detection," ResearchGate, Feb. 2008, DOI: 10.1007/978-3-540-77949-0_15.
"3rd Generation Partnership Project; Technical Specification Group Services and System Aspects;Management and orchestration; Concepts, use cases and requirements (Release 16)," 3GPP TS 28.530 V16.1.0 (Dec. 2019), Technical Specification.
"3rd Generation Partnership Project; Technical Specification Group Services and System Aspects; Network architecture (Release 12)," 3GPP TS 23.002 V12.5.0 (Jun. 2014), Technical Specification.

* cited by examiner

[Fig 1]
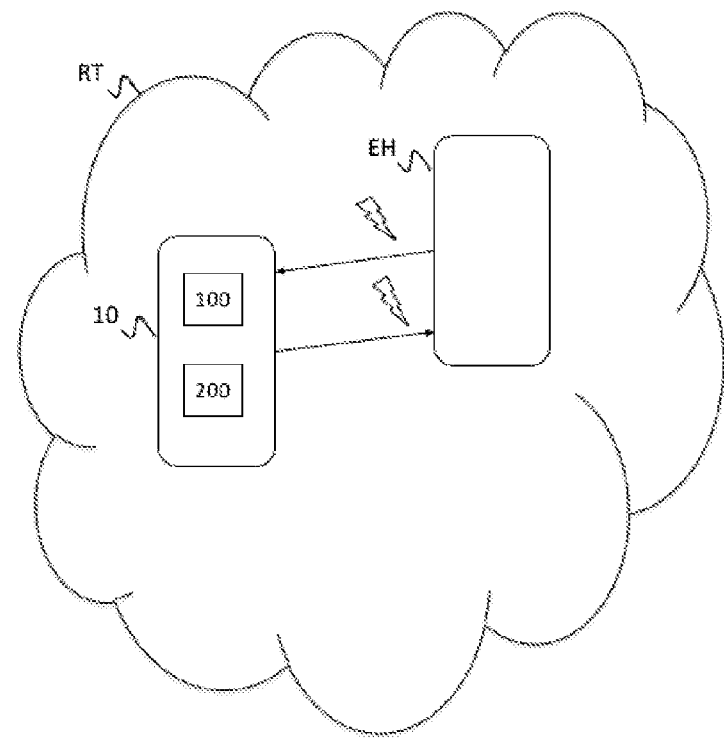
[Fig 2A]
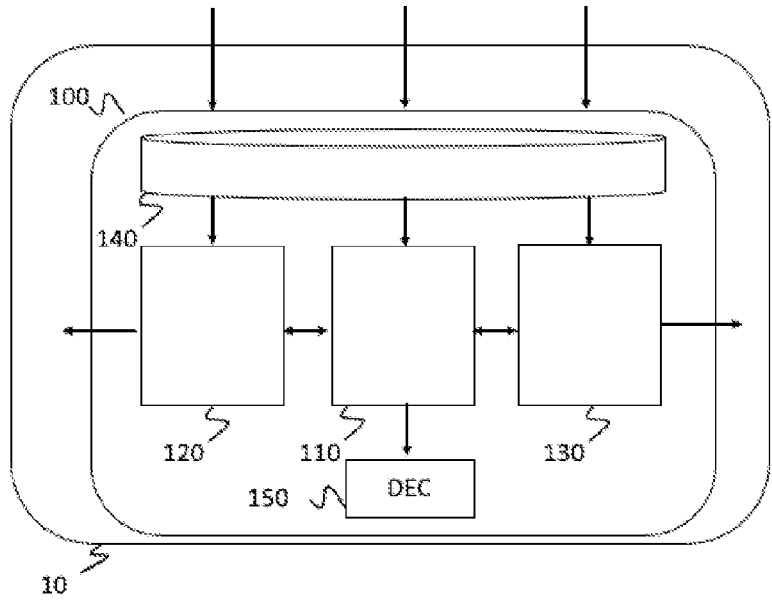

[Fig 2B]
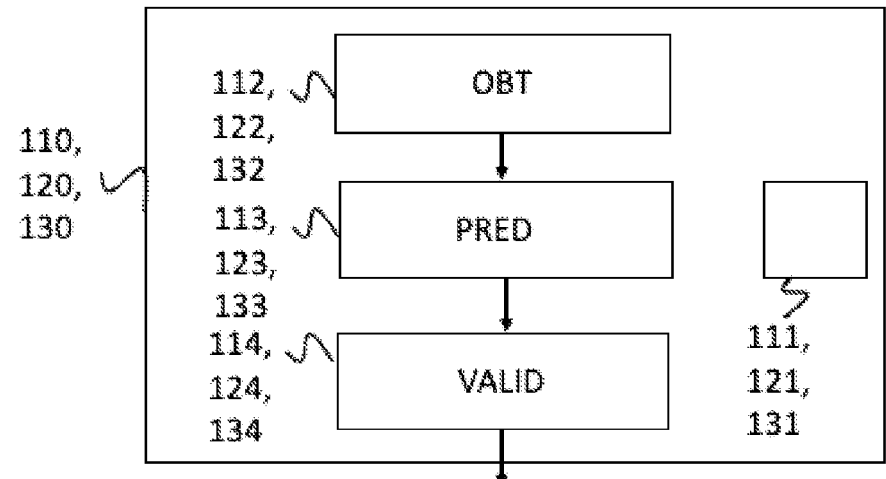
[Fig 3]
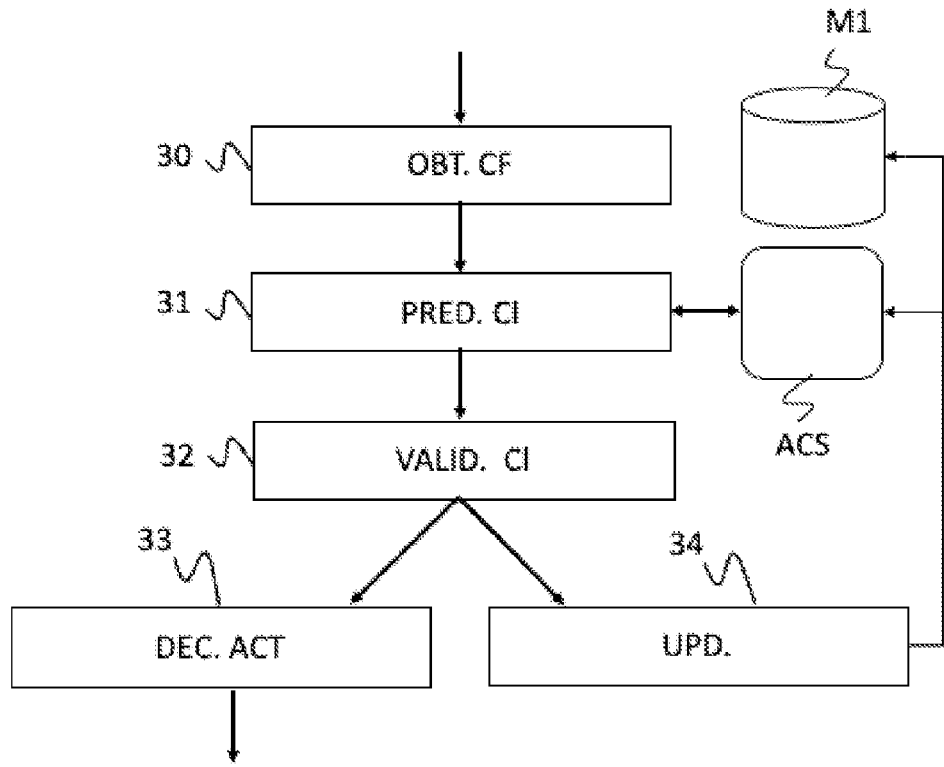

[Fig 4]
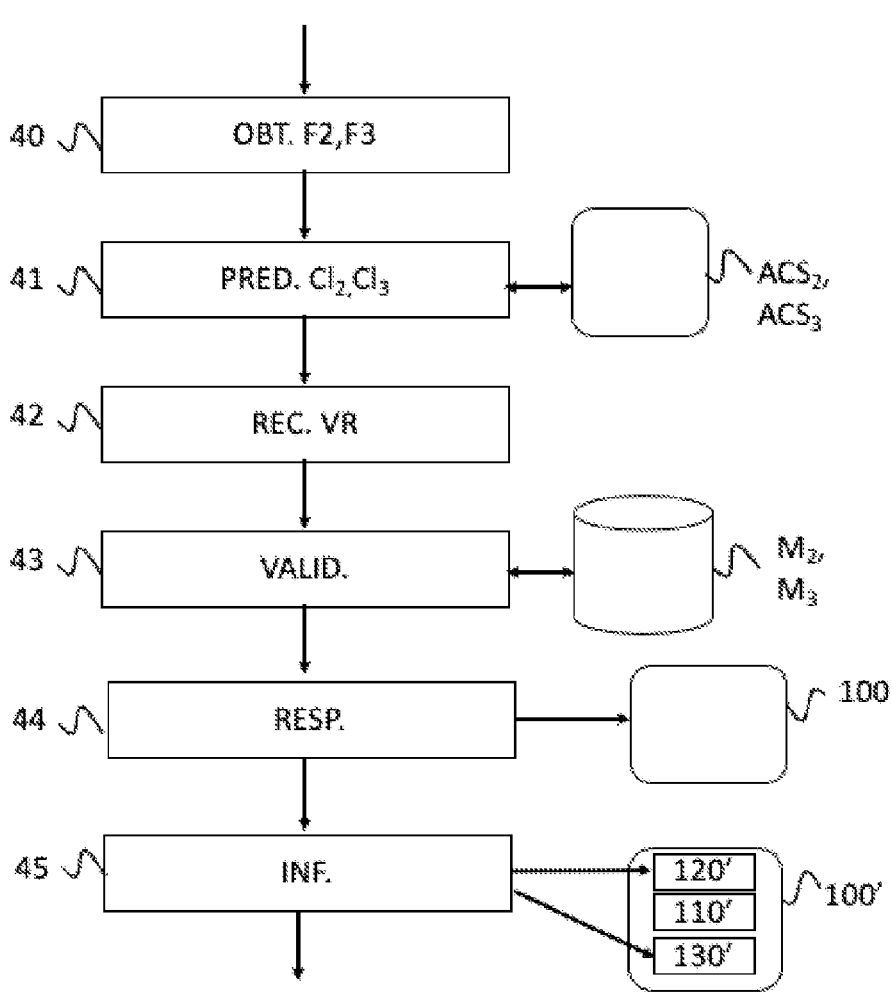

[Fig 5]
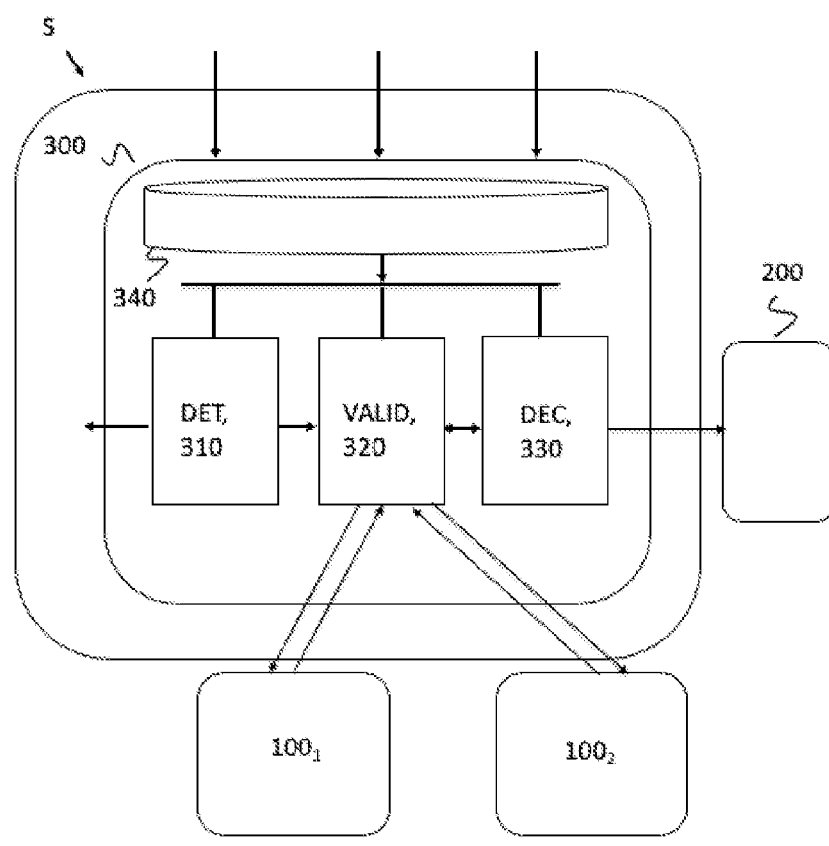
[Fig 6]
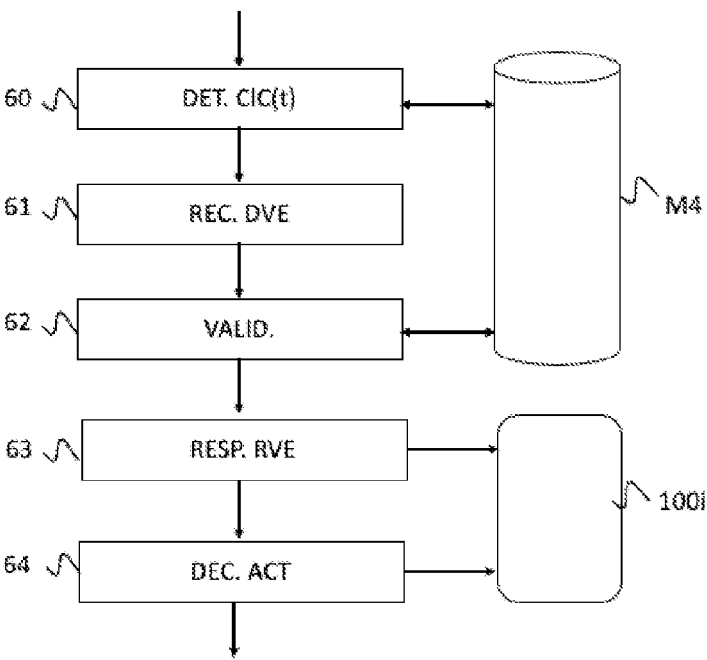

[Fig 7]
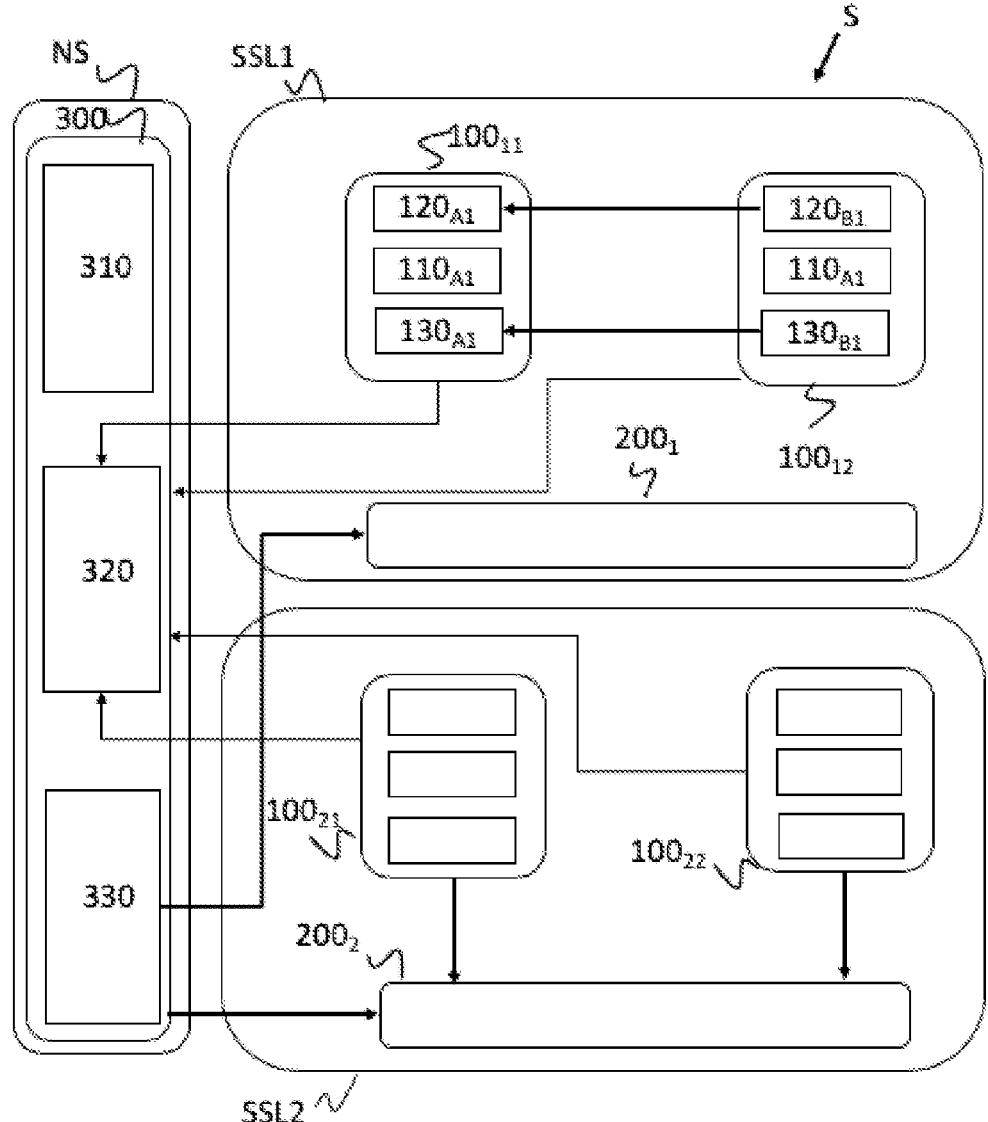
[Fig 9]
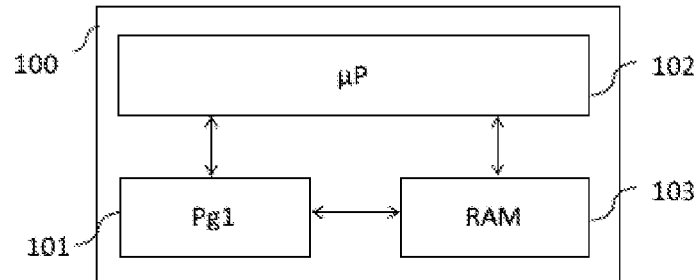

[Fig 8]
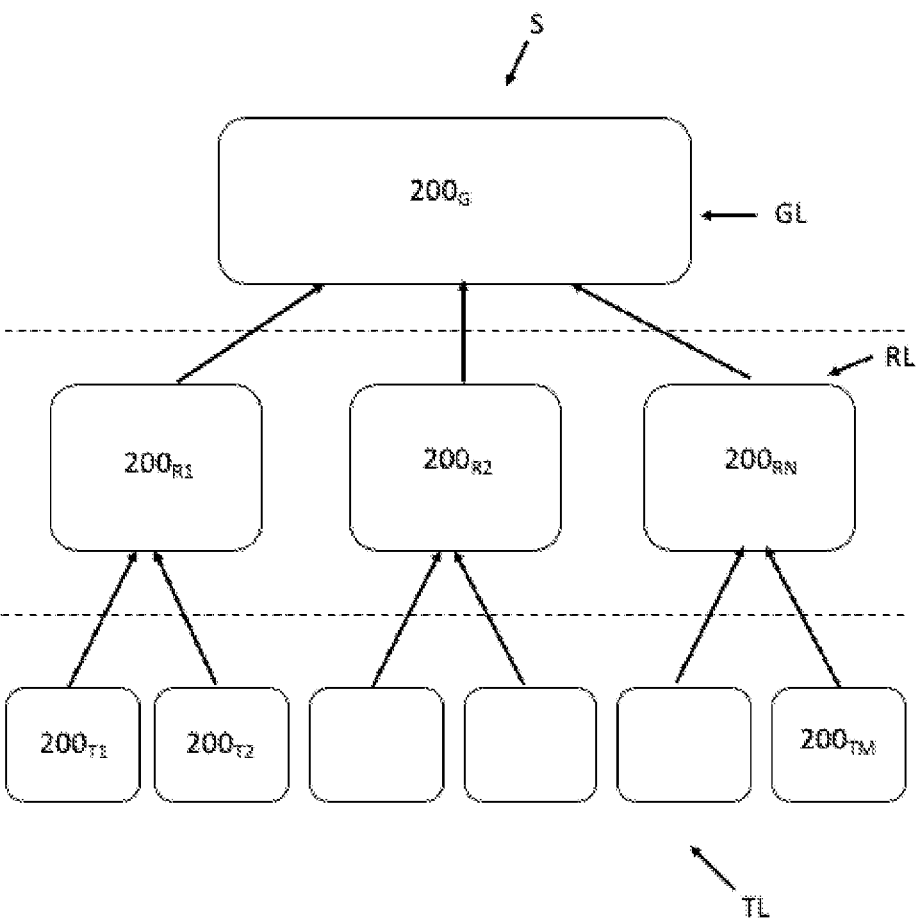
[Fig 10]
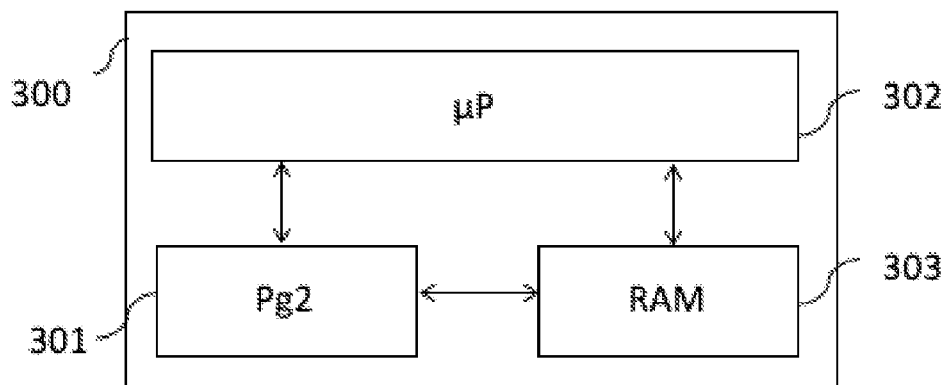

METHOD FOR DETECTING ANOMALIES IN A COMMUNICATION NETWORK, METHOD FOR COORDINATING ANOMALY DETECTION, CORRESPONDING DEVICES, ROUTER EQUIPMENT, ANOMALY MANAGEMENT SYSTEM AND COMPUTER PROGRAMS

CROSS-REFERENCE TO RELATED APPLICATIONS

This Application is a Section 371 National Stage Application of International Application No. PCT/FR2021/051009, filed Jun. 3, 2021, which is incorporated by reference in its entirety and published as WO 2021/245361 A1 on Dec. 9, 2021, not in English.

TECHNICAL FIELD OF THE INVENTION

The field of the invention is the management of anomalies that may appear in a communication network. More specifically, the invention can improve the security and resilience of this network.

The invention particularly applies to the management of anomalies in a mobile communications network, the architecture of which complies with the Third Generation Partnership Project (3GPP) standard, in one of its current or future versions.

PRIOR ART

The 5th generation 3GPP standard specifies a new mobile communications network architecture, which responds to a need for redesign created by the advancement of technology, the emergence of new services and an increasing number of Internet users. It takes into account new parameters such as the need for global coverage combined with low latency, high reliability and security. In addition, it enables the networking of objects, known as the Internet of Things (IoT), which promises to bring new services and facilities to people's daily lives.

A major innovation introduced by SG technology is scalability. Indeed, the SG architecture takes into account the possible need to expand the network capacity to meet the growth in user traffic and the needs of new services offered by providers. To do this, it proposes Network Slicing, which provides both the scalability and flexibility needed to manage a larger network. According to the 3GPP 5G standard, a network slice consists of physical and/or virtual network functions PNF/VNF (for Physical Network Functions/Virtual Network Functions) that are interconnected and may belong to the access and/or core part of the network. It is noted that these network functions can be managed by separate operators. The synthesis of a network slice thus serves a particular functional purpose and, once instantiated, is used to support certain communication services for a dedicated "vertical" client (e.g. a company, a service offering, etc.) by providing a given quality of service guarantee. Each network slice may have its own architecture, its own Fault-management, Configuration, Accounting, Performance, and Security (FCAPS) operations and its own security for a particular use case.

This new 5G architecture faces a number of security and reliability risks and challenges, especially due to the virtualisation and automation of such a network. In order to achieve the envisaged objectives, these risks must be anticipated, both conceptually, by clearly defining the functionality and scope of the security and privacy features of the architecture, and technically, by using the most appropriate solutions in the design of the architecture.

Given the wide range of vertical sectors/customers involved, e.g. e-health, emergency services, smart grids, it is essential to strongly isolate the different slices. In addition, these SG infrastructure slices offered by telecommunications operators must offer a level of availability, performance and security at least equal to the infrastructure they replace. In particular, the architecture must ensure that the control and data plans of the slices are not exposed to attack, including computer attacks.

In addition to the security challenges, network function virtualisation (NFV) introduces significant changes in network fault management. Such failures include technical failures or malfunctions in the network, or again a degradation of the quality of service that could lead to a breach of the SLA conditions (Service Level Agreement). This is because virtual network functions can be deployed anywhere in the infrastructure through dynamic interconnections. As a result, the underlying dependencies of a network service may change several times during its life cycle, which makes FCAPS operations more difficult and fault propagation analysis more complex.

Fault management is further complicated by the fact that each network slice may be supported by network sub-slices which can be managed by different network operators (for example, one sub-slice can contain access functions, while another sub-slice can group functions belonging to the network core).

There is therefore a need for a solution to detect attacks and failures in a communication network that takes into account these new constraints in terms of architecture and services to ensure an increased level of security and resilience in this network.

The invention improves the situation.

DISCLOSURE OF THE INVENTION

The invention responds to this need by proposing a method for detecting anomalies in a telecommunications network that may affect a target element of the network. Such a method implements, at the level of a first anomaly detection module:

obtaining a plurality of first measurement data representative of a resource usage of said network at a given time at the level of said target element;

determining from the plurality of first measurement data at least one anomaly category from a plurality of anomaly categories comprising at least one category representative of a presence of attack, one category representative of a presence of a fault and one category representative of an absence of anomaly;

requesting for validation of the determined anomaly category to a second attack detection module and/or to a third fault detection module, depending on the determined anomaly category, said request comprising at least at the given time, an identifier of the target item, the determined anomaly category and the plurality of first measurement data; and on receipt of at least one response from the second and/or third module, the decision according to the response received from a processing action to trigger in the network.

The invention proposes a completely new and inventive approach to managing the security and resilience of a telecommunications network, which proposes to use measurement data of resource usage of the network common to attacks and to failures of the network to detect an anomaly at the level of a target network element more generally and process it. No limitation is attached to the nature of the target element. A target element can thus refer here to an item of node equipment in the network as well as to a set of equipment grouped in the same geographical area, or even to a network slice. Generally, an anomaly detection technique is used to detect observations that deviate from those usually observed or expected. Such anomalies can notably be related to critical events in the real-world. For example, a fraudulent credit card transaction is an anomaly because it results in an unauthorised charge to the associated bank account. According to the invention, a faulty behaviour of a target element is considered an anomaly because it leads to a deviation from a usual behaviour of the target element. For example, an Internet intrusion is also an anomaly, because it uses unauthorised access and generates abnormal network traffic.

The invention takes advantage of the fact that both attacks and failures may have common characteristics, such as abnormally high power consumption or overloading of the network equipment under attack or experiencing a failure. In addition, an attack can be implemented by causing network equipment to fail. According to the invention, an anomaly detected in the network can be related to an attack, a failure or both at the same time.

According to the invention, an anomaly category is determined on the basis of this common measurement data, and this determination is then reinforced by more targeted detections of failures and attacks by two modules dedicated respectively to the detection of attacks and failures. Each of these two specific modules exploits its own resource usage measurement data of the network, identified as relevant for detecting attacks, respectively failures, and then validating the category or categories of anomalies detected by the generic anomaly detection module.

In this way, the invention makes it possible to process the attacks and failures separately when they occur separately, but also to take account of their correlated occurrences.

Unlike the prior art, which separately processes the detection of attacks on a network from the management of failures that occur at the level of the resources of this network, the invention implements a common and pooled solution, which takes advantage of the correlation identified by the inventors between the two aspects of security and resilience to reinforce the reliability of its detection and the effectiveness of its processing actions.

According to an aspect of the invention, the method implements:

at the level of the second attack detection module:
  obtaining of a plurality of second measurement data characteristic of an attack and representative of a resource usage of said network at said given time at the level of said target element;
  determining from the plurality of second measurement data, of an attack category, among a plurality of attack categories comprising at least one category representative of a type of attack and one category representative of an absence of attack;
  responding to the validation request from the first module, comprising at least the attack category determined by the second module, known as the validated attack category;
at the level of the third failure detection module:
  obtaining of a plurality of third measurement data characteristic of a network failure and representative of a resource usage of said network at said given time at the level of said target element;
  determining from the plurality of third measurement data, of a failure category, among a plurality of failure categories comprising at least one category representative of a type of failure and one category representative of an absence of failure; and
  the response to the validation request from the first module, comprising at least the failure category determined by the third module, known as the validated failure category.

According to the invention, the second and third modules rely on attack/failure measurement data specific to attacks/failures, which allows them to be more rapidly reliable and mature (in other words, to converge more rapidly). This allows them to correct the detection errors of the generic anomaly detection module.

According to yet another aspect of the invention, the determination of an anomaly category comprises at least one prediction of said at least one anomaly category by a first classification model and the method implements, upon reception of the validation response or responses from the second and/or third module, updating a first learning set to train the first classification model used by the first module for the prediction of said at least one anomaly category, with the plurality of first measurement data associated with the validated category of attacks and/or failures received in the validation response or responses and a triggering of a learning phase of the first classification model using the updated first learning set.

Advantageously, the anomaly category or categories are predicted using a first classification model previously trained with an initial learning set which is then reinforced by incorporating the outputs of specific detection modules. In this way, the first classification model of the anomaly detection module continues to learn after its deployment and improves its performance over time.

According to yet another aspect, said at least one received validation response further comprises a first recompense valued according to a match of the validated category of attacks, respectively failures, with the anomaly category predicted by the first module, said first recompense having a positive value in case of a match, and a negative value in case of a non-match; and the learning phase of the first classification model is triggered at a time delay depending on the value of the received first recompense.

The objective of the first anomaly detection module is to maximise its recompense value. It will therefore increase the frequency of updates on receipt of a negative recompense and decrease it in the case of a positive recompense. In this way, it tends to become increasingly efficient over time.

According to yet another aspect of the invention, following the validation of the anomaly category determined by the first module, an information message is transmitted by the second, respectively the third module to a neighbouring anomaly detection device in the communication network, said information message comprising at least the given time, the identifier of the target element, the validated category of attacks, respectively failures and the plurality of second, respectively third, associated measurement data.

One advantage is that it reinforces the detection of neighbouring devices by communicating to them information about the anomalies detected by the local device. This allows them to enrich, for example, the learning data set of their automatic classification system when using such a system.

In addition to an internal validation mechanism, the invention provides for the dissemination of detection results between neighbouring anomaly detection devices. Any anomaly detection validated within an anomaly detection device therefore benefits its neighbours, which makes it possible to improve the detections made by each of them, and thus more globally the security of the network.

According to yet another aspect of the invention, the anomaly detection method implements a reception of an information message from a neighbouring anomaly detection device in the communication network, said message comprising at least a given time, an identifier of a target element, a plurality of second, respectively third, measurement data associated with the given time and a class of attacks respectively failures detected at the level of the target element, updating a second, respectively third, learning set used to train a second, respectively third, classification model used by the second, respectively third, detection module using the information received and a triggering of a learning phase of the second, respectively third, classification model using the updated second, respectively third, learning set.

An advantage is that the anomaly detection device, in particular its specific detection modules, also learns from its neighbours.

According to yet another aspect of the invention, the method implements:

at the level of the second, respectively third, module:

transmitting to a network anomaly detection co-ordination device an external validation request comprising at least the category of attacks respectively failures detected, the plurality of associated second, respectively third, measurement data, the identifier of the target element and the given time; and receiving an external validation response comprising at least one category of attacks respectively failures validated by said anomaly detection coordination device.

One advantage is to implement an external validation, in addition to internal validation, by another device configured to detect anomalies in the network, to which it is connected and which has a more global view of the network and therefore higher attack/failure detection performance. Advantageously, this other device performs functions of coordination of several network anomaly detection devices.

According to yet another aspect of the invention, the received external validation response further comprises a second recompense having a positive value if the detected category of attacks, respectively failures, corresponds to the category of attacks, respectively failures, detected by the coordination device and a negative value otherwise and the method comprises updating the second, respectively third, set of learning data by adding the plurality of second, respectively third, measurement data associated with the category of attacks, respectively failures, validated by the coordination device.

The recompense mechanism also applies between the coordination device and each of the anomaly detection devices it oversees, allowing them to bring their classification model to a mature stage more rapidly.

The invention also relates to a computer program product comprising program code instructions for implementing a method for detecting anomalies according to the invention, as described previously, when it is executed by a processor.

The invention also relates to a computer-readable storage medium on which the computer programs as described above are recorded.

Such a storage medium can be any entity or device able to store the program. For example, the medium can comprise a storage means, such as a ROM, for example a CD-ROM or a microelectronic circuit ROM, or a magnetic recording means, for example a USB flash drive or a hard drive.

On the other hand, such a storage medium can be a transmissible medium such as an electrical or optical signal, that can be carried via an electrical or optical cable, by radio or by other means, so that the computer program contained therein can be executed remotely. The program according to the invention can be streamed in particular on a network, for example the Internet network.

Alternatively, the storage medium can be an integrated circuit in which the program is embedded, the circuit being adapted to execute or to be used in the execution of the above-mentioned detection method.

The invention also relates to a device for detecting anomalies in a telecommunications network, comprising a first anomaly prediction module, a second attack prediction module and a third failure prediction module.

The first module is configured for:

obtaining a plurality of first measurement data representative of a resource usage of said network at a given time at the level of said target element;

determining from the plurality of first measurement data at least one anomaly category from a plurality of anomaly categories comprising at least one category representative of a presence of attack, one category representative of a presence of a fault and one category representative of an absence of anomaly;

requesting a validation of the determined anomaly category to a second attack detection module and/or to a third fault detection module, depending on the determined anomaly category, said request comprising at least at the given time, an identifier of the target item, the determined anomaly category and the plurality of first measurement data; and on receipt of at least one response from the second and/or third module, deciding according to the response received from a processing action of the anomaly to trigger in the network.

Advantageously, said device is configured to implement the method for detecting anomalies mentioned above, according to its different embodiments.

Advantageously, said device can be integrated into an item of router equipment of the communication network. For example, it is integrated into a virtual machine hosted by the router equipment.

The aforementioned corresponding item of router equipment, anomaly detection device and computer program have at least the same advantages as those provided by the afore-mentioned method according to the different embodiments of the present invention.

Correlatively, the invention also relates to a method for coordinating the detection of anomalies in a communication network. Such a method implements, at the level of a network coordination device:

receiving, from at least one anomaly detection device of the network, of an external validation request comprising at least one category of attacks, respectively failures, detected by said detection device, a plurality of measurement data characteristic of an attack, respectively a failure and representative of a use of network resources at a given time at the level of a target element of said network;

validating said at least one category of attacks, respectively failures, detected by said detection device, said received category of attacks, respectively failures, by matching the received category of attacks, respectively failures, with at least one category of attacks, respectively failures, detected by said coordination device at said given time and at the level of said target element; and transmitting to the anomaly detection device an external validation response comprising at least the category of attacks, respectively failures detected by said coordination device.

The invention thus proposes to coordinate the detection of anomalies in a communications network using a device that has a global view on several detection devices and acts as a reinforcement of their experience. In particular, it can rely on the results of attacks and failures stored in memory, from its own detection device if it has one and from other anomaly detection devices that it coordinates.

According to one aspect of the invention, said response further comprises a recompense having a positive value if the category of attacks, respectively failures, received corresponds to the category of attacks, respectively failures, detected by the coordination device and a negative value otherwise.

An advantage is that the anomaly detection device can exploit this recompense value to define an update of the attack or failure classification model that produced an erroneous prediction.

Advantageously, said response further comprises a configuration parameter of a classification model used by said anomaly detection device. For example, the anomaly detection device implements a supervised learning system of the deep neural network type and this configuration parameter is a learning rate. By acting on this learning rate, the coordination device influences the learning capacity of the detection device.

According to yet another aspect of the invention, the response further comprises a type of measurement data to be added to said plurality of measurement data collected by the anomaly detection device.

In this way, the input vector is enriched with one or more items of measurement data considered by the coordination device to be more discriminating.

The invention also relates to a computer program product comprising program code instructions for implementing a method for coordinating the detection of anomalies according to the invention, as described previously, when it is executed by a processor.

The invention also relates to a computer-readable storage medium on which the computer programs as described above are recorded.

Such a storage medium can be any entity or device able to store the program. For example, the medium can comprise a storage means, such as a ROM, for example a CD-ROM or a microelectronic circuit ROM, or a magnetic recording means, for example a USB flash drive or a hard drive.

On the other hand, such a storage medium can be a transmissible medium such as an electrical or optical signal, that can be carried via an electrical or optical cable, by radio or by other means, so that the computer program contained therein can be executed remotely. The program according to the invention can be streamed in particular on a network, for example the Internet network.

Alternatively, the storage medium can be an integrated circuit in which the program is embedded, the circuit being adapted to execute or to be used in the execution of the above-mentioned coordination method.

The invention also relates to a device for coordinating the detection of anomalies in a communications network. Such a device is configured for receiving, from at least one anomaly detection device of the network, of an external validation request comprising at least one category of attacks, respectively failures, detected by said device, a plurality of measurement data characteristic of an attack, respectively a failure and representative of a use of network resources at a given time at the level of a target element of said network;

validating said at least one category of attacks, respectively failures, detected by said detection device, said received category of attacks, respectively failures, by matching the received category of attacks, respectively failures, with at least one category of attacks, respectively failures, detected by said coordination device at said given time and at the level of said target element; and transmitting to said anomaly detection device an external validation response comprising at least the category of attacks, respectively failures detected by said coordination device.

Advantageously, said device is configured to implement the method for coordinating the detection of anomalies mentioned above, according to its different embodiments.

Advantageously, said device can be integrated into an item of router equipment of the communication network.

The aforementioned corresponding item of router equipment, device for coordinating anomaly detection and computer program have at least the same advantages as those provided by the afore-mentioned method according to the different embodiments of the present invention.

Correlatively, the invention also relates to a system for managing anomalies in a telecommunications network. Such a system comprises at least one device for detecting anomalies according to the invention and a device for coordinating the detection of anomalies according to the invention.

According to one aspect of the invention, said network comprises at least one slice comprising a said coordination device, said slice being configured to support a communication service for a given customer and comprising at least two sub-slices managed by separate administrative entities, each sub-slice comprising at least one target element, and a said anomaly detection device configured to detect anomalies at said at least one target element of said sub-slice.

In contrast to the state of the art which focuses on detecting or predicting faulty services at the level of a sub-slice of a network, the invention proposes to coordinate at the level of a slice of a network the actions of anomaly detection devices of the different sub-slices, to take into account the fact that the sub-slices, although managed by different operators, are not independent in reality. One advantage is to get a general view of the slice, while keeping a fine granularity and therefore a good accuracy.

The invention thus provides an end-to-end anomaly management solution, which is well suited to a sliced architecture such as that proposed by the future 5G standard of the 3GPP.

Advantageously, the invention is also well suited to a communication network with a hierarchical architecture such as that proposed by the existing 2G; 3G and 4G standards of the 3GPP.

For example, a network complying with one of these standards distinguishes a first hierarchical level, called technologies, corresponding for example to micro-cells of a cellular network, each technology comprising one or more anomaly detection devices.

It also includes a second hierarchical level, called regions, higher than the first, whose regions correspond, for example, to macro-cells of a cellular network. Each region encompasses several technologies or micro-cells and comprises a detection device configured to validate the anomaly detections made by the anomaly detection devices of each of the micro-cells attached to it. As for the third hierarchical level, called general, it comprises a coordination device, for example integrated into a centralised item of node equipment, which receives the validation requests issued by the anomaly detection devices of each of the regions.

BRIEF DESCRIPTION OF THE FIGURES

Other purposes, features and advantages of the invention will become more apparent upon reading the following description, hereby given to serve as an illustrative and non-restrictive example, in relation to the figures, among which:

FIG. 1: diagrammatically shows an example of an item of node equipment in a communication network, which undergoes an attack or a failure;

FIG. 2A: diagrammatically shows an example of functional structure of an anomaly detection device according to an embodiment of the invention;

FIG. 2B: diagrammatically shows an example of functional structure of the anomaly detection modules, respectively of attacks and failures of the anomaly detection device according to an embodiment of the invention;

FIG. 3: shows in the form of a flowchart the steps of a method for detecting an anomaly in a communication network according to an embodiment of the invention;

FIG. 4: describes in the form of a flowchart the steps of a method for detecting anomalies in a communication network according to an embodiment of the invention;

FIG. 5: diagrammatically shows an example of functional structure of an anomaly detection coordination device according to an embodiment of the invention;

FIG. 6: describes in the form of a flowchart the steps of the method for coordinating an anomaly detection in a communication network according to an embodiment of the invention;

FIG. 7: diagrammatically shows the functional structure of an anomaly management system in a communication network, when organised according to a slice architecture, according to a first embodiment of the invention;

FIG. 8: diagrammatically shows the functional structure of an anomaly management system in a communication network, when organised according to a hierarchical architecture, according to a second embodiment of the invention;

FIG. 9: diagrammatically shows the hardware structure of an anomaly detection device according to an embodiment of the invention; and FIG. 10: diagrammatically shows the hardware structure of a device for coordinating anomaly detection in a communication network according to an embodiment of the invention.

DETAILED DESCRIPTION OF THE INVENTION

The general principle of the invention is based on the detection of anomalies in a communication network by a generic detection module which determines at least one anomaly category from a plurality of first measurement data representative of a use of physical resources of this communication network. The anomaly category or categories in question may be an attack category and/or a failure category. There is no limitation on the nature of the attacks and failures that can be considered by the invention.

The anomaly category thus determined is then submitted for validation to a specific attack detection module and/or a specific failure detection module, depending on whether it is an attack category or a failure category. It should be noted that the detection of anomalies according to the invention can relate to target elements of various natures, such as for example an item of equipment in the network (for example an item of physical equipment such as a router or a virtual function), a set of physical and/or virtual equipment, a service, a geographical area in which several nodes in the network are located, etc.

Referring to FIG. 1, a communication network RT comprising an item of node equipment EH, for example an item of router equipment, a switch or an access control equipment, which undergoes a network failure and/or an attack (target element in the sense of the invention) is shown. This example is considered illustrative and does not in itself limit the invention, other application contexts of the invention may be envisaged. The failure and/or attack undergone by the item of node equipment EH is detected from measurement data collected by one or more probes (not shown), these probes being able to be embedded in the item of node equipment EH and/or in other network equipment communicating with this latter or more generally be placed at any point in the network. The collected measurement data can also be aggregated and stored in event logs, also called logs. More generally, this measurement data, relating to a use of network resources by the item of node equipment EH, is obtained from one or more separate sources and is then processed by an anomaly detection device 100 integrated in an item of node equipment 10 of the communication network RT. More generally, the item of equipment EH is an item of host equipment connected to the RC communication network and providing services to other equipment or systems. In a virtualised network, such a host device hosts a virtual system, also called a virtual machine, which uses its physical resources to perform such services.

The device 100 is configured to detect one or more anomalies, determine whether it is an attack and/or a network failure and decide on an appropriate processing action to be triggered at an actuator device 200, which in this example is integrated with the node equipment 10. Naturally, the invention is not limited to this example and the device 100 can also be integrated into a virtual machine hosted by the equipment 10.

In relation to FIG. 2A, the anomaly detection device 100 according to the invention comprises three main modules, connected to each other:

a first anomaly detection module 110;

a second attack detection module 120; and a third failure detection module 130.

In this embodiment of the invention, the three modules 110, 120, 130 are organised in a similar manner, for example according to the architecture of FIG. 2B. Each module 110, 120, 130 comprises a sub-module OBT for obtaining and processing measurement data collected by one or more probes in the network, in the environment of the item of host equipment EH and beyond, a sub-module DET for determining an anomaly category, respectively of attacks or failures, using here an automatic classification model 111, 121, 131 which takes the plurality of measurement data as input and provides as output one or more determined anomaly categories, respectively attacks or failures, and a VALID sub-module for validating the determined category or categories.

The sub-module OBT obtains pluralities of measurement data representative of a network resource usage of the item of host equipment EH and more generally of a behaviour of the item of host equipment EH in the network at a given time t. The sub-module OBT extracts at a given time measurement data collected and then aggregated over a given time period comprising said moment. To do this, it analyses the collection sources available to it, such as connection logs, probe counters, IDS (Intrusion Detection Systems), firewalls, access control systems, etc.

The term "module" can correspond to a software component as well as to a hardware component or a set of hardware and software components, a software component itself corresponding to one or more computer programs or subprograms, or more generally, to any element of a program capable of implementing a function or set of functions.

Three types of measurement data obtained by the device 100 are distinguished:

first measurement data representative of common characteristics that allow both an attack and a failure of the communication network to be detected (and which are therefore useful for detecting both an attack and a network failure). These are characteristics of the use of network resources which can take various forms such as numerical, for example, for statistics, counters, KPIs (Key Performance Indicators) or textual, for example, log files, alarms, network tickets, etc.) This measurement data, when it takes or exceeds certain values for numerical data, or when it returns certain information or corresponds to certain patterns for textual data, is symptomatic of the presence of an attack or a network failure. For example, such measurement data includes a measure of power consumption, exhaustive consumption or depletion of power, overload, exceeding a threshold of computational and/or communication resource occupancy, congestion rate, interference level, etc.;

second measurement data representative of characteristics which typically, when they show or exceed certain specific values or correspond to certain patterns, or show certain information, may indicate the presence of a network attack. This attack may be ongoing or forthcoming. This measurement data is therefore relevant and useful for detecting an ongoing attack or predicting a future attack. It may vary depending on the nature of the attacks that may affect the network. Examples of such attacks include Denial of Service (DoS) attacks, global or distributed botnet attacks and fuzzing threat attacks, which involve trying to defeat a machine by feeding it randomly selected data. For example, this second measurement data relates to a rate of connection errors, a rate of errors recorded at the level of an item of server equipment of the network, a number of rejected messages, sent and/or received, a rate of false alarms generated by an IDS system and/or by a firewall;

third measurement data representative of characteristics which typically, when they show or exceed certain specific values or feed back certain information, can indicate the presence of a network attack. This measurement data is therefore relevant and useful for detecting and characterising a current or future failure. Examples include call rejection rate, congestion rate, number of users attached to a radio cell, number of downlink and uplink data packets, RSRP (Reference Signal Receive Power) measurement, RSRQ (Reference Signal Receive Quality) measurement, signal to noise ratio, alarms, etc.

It is noted that the second and third measurement data may be for separate characteristics of network resource use or may share some common characteristics. Furthermore, it is noted that the plurality of relevant measurement data for each type of anomaly can be defined in standards such as 3GPP or determined by experts in the field of networks and cybersecurity or generated by an automatic model, but it is also possible to use an artificial intelligence solution to build vectors of measurement data that maximise the detection performance of each detection module, and to update them over time as a function of the discovery of new attacks and/or failures for example.

According to the invention, the first measurement data representative of characteristics common to an attack and a network failure is obtained by sub-module 112 of the anomaly detection module 110, the second measurement data representative of characteristics specific to an attack is obtained by sub-module 122 of the attack detection module 120, and the third measurement data specific to a network failure is obtained by sub-module 132 of the network failure detection module 130.

In parallel, the sub-modules OBT 112, 122, 12 form measurement data vectors that feed the sub-modules PRED 113, 123, 133 for predicting a corresponding class of anomalies, attacks and failures respectively.

Advantageously, the sub-modules PRED 113, 123, 133 each exploit the obtained measurement data vectors to determine an anomaly category, respectively of attacks and failures, each implementing, in the embodiment described here, a dedicated prediction model built using an artificial intelligence technique. Note that such a prediction model can be mono-label, i.e. it has a single output variable that can take either textual or numerical values.

With a textual output variable, of a class type for example, the model solves a classification problem, whereas for a numerical output variable, such as for example a time value, it solves a regression problem. When the output class can have several values, such as "presence of an attack", "absence of an attack", "presence of a failure" and "absence of a failure", it is called a multi-class model.

The prediction model used can also be multi-label, that is it predicts several output variables from a single vector of input measurement data, such as an anomaly class variable and a continuous numerical variable, such as a time variable. Advantageously, the system is configured to predict an attack and/or failure and the time (present or future) at which it occurs or will occur.

Naturally, the invention is not limited to this example and the determination of an anomaly category can also use a predictive model based on pre-established rules.

Advantageously, in each module, the prediction model is implemented by a supervised learning system ACS1, ACS2, ACS3 previously trained with a set DS1, DS2, DS3 of labelled learning data. Such a supervised learning system is, for example, an automatic classification system, known per se. For example, each set comprises pairs associating to a plurality of first, respectively second and third measurement data or measurement data vector, a label corresponding respectively to the category of anomalies, attacks or failures that the supervised learning system must produce as the output for this vector presented at the input. The learning sets D51, DS2, D53 are for example stored in a memory M of the device 100 which can be shared by the three modules 110, 120, 130. Advantageously, the plurality of first, second and third measurement data collected is also stored in this memory M. As a variant, each detection module 110, 120, 130 accesses its own memory and stores its own data there.

The supervised learning system implemented by each of the modules 110, 120, 130 is based on an artificial intelligence technique known per se, for example of the deep neural network type, such as a recurrent neural network of the LSTM (Long Short Term Memory) type, a convolutional neural network, or a dense neural network.

With regard to the sub-module VALID 114, 124, 134 for validating a predicted anomaly category, respectively of attacks and failures, its validation function differs depending on whether it is the sub-module 114 integrated into the anomaly detection module 110 (generic) or the sub-modules 124, 134 integrated into the detection modules 120, 130 of attack respectively failure (specific).

More specifically, the learning of the module 110, because it uses initial measurement data representative of characteristics common to attacks and network failures, can require more time to implement a powerful and mature prediction mechanism than the specific detection modules 120, 130. For example, it is configured to produce at the output at least one category that indicates that the detected anomaly is an attack, one category that indicates that the detected anomaly is a failure, and one class that corresponds to the absence of anomaly detection, without necessarily being able to detect a particular type of attack or failure. When the device 100 is deployed in the communication network RC, even if it has undergone a prior learning phase, its anomaly prediction model enables it to detect a deviation from a normal situation, therefore an anomaly, but however it is not always reliably able to determine whether the detected anomaly is an attack and/or a network failure. It will therefore predict whether the detected anomaly is an attack or a failure, or neither one nor the other, and request validation from the specific detection modules 120, 130. The sub-module VALID 114 of the detection module 110 has precisely this function. The responses of the specific detection modules 120 and 130 will allow the gradual learning of the classification model of module 110 and the improvement of the classifications. According to the invention, the module 110 transmits a validation request message DV to at least one of the two specific detection modules 120, 130, comprising the vector V1($t$) of first measurement data, the anomaly category CI1($t$) predicted by the first module 110, the given time t and an identifier $ID_H$ of the host or target equipment of the anomaly. The specific destination module 120, 130 is chosen according to the predicted category. If the anomaly category is of the attack type, the message DV is transmitted to the second module 120; if it is of the failure type, it is transmitted to the third module 130; if both types of categories have been predicted for the same input vector, the validation request is transmitted to both specific modules. It is noted that, when the determined anomaly category corresponds to an absence of attack and/or network failure, the module 110 cannot transmit anything to the specific modules 120, 130. Nevertheless, it stores the result obtained in memory and advantageously transmits a validation request which groups together several negative results obtained over a predetermined time period. In this way, the specific modules 120, 130 regularly verify that the module 110 does not generate false negatives, that is that it does not miss real network anomalies, but without generating superfluous data traffic.

The validation request message DV is received and processed by the recipient sub-module VALID 124, 134. Its role is to validate or invalidate the anomaly category predicted by the first module 110, depending on the detection results obtained by the specific module 120, 130 to which it belongs. To do so, it extracts from the received message the time t and the host identifier associated with the anomaly category to validate and searches, for example in the memory M, whether it has detected an attack, respectively a network failure, associated with this time and this host or it triggers the determination of a category of attacks respectively network failures from the measurement data vector it has itself obtained at time t. It compares the category it predicted with the category it received in the validation request. If they match, it responds to the first module with a response message validating the anomaly category. If they do not match, for example because it has not detected an attack, respectively a network failure, or has detected an attack, respectively a failure, of another type (if the validation request includes a detected type of attack or failure) it responds with a message invalidating the anomaly category predicted by the module 110 and comprising, as a correction, the category of attacks, respectively failures, which it has itself detected in association with the first data vector, the time t and the host identifier.

It is noted that the validator module can systematically include the class of attacks respectively failures that it has detected, whether or not it corresponds to the class of anomalies detected by the generic module 110. Thus, the generic module obtains in all cases the class of attacks respectively failures validated by the specific module.

Advantageously, the sub-module 124, 134 determines a recompense value for the anomaly that it has just validated or invalidated, positive if the anomaly detected by the module 110 corresponds to an attack, respectively a failure, that it has detected, and negative otherwise. A negative recompense value therefore corresponds to a penalty. For example, the recompense values are simply +1, −1. Of course, the invention is not limited to this example and a wider range of values can be assigned to the recompense, in a manner known per se, by applying for example the technique described in the paper by Servin et al. entitled "Multi-Agent Reinforcement Learning for Intrusion Detection", published in the work "European Symposium on Adaptive and Learning Agents and Multi-Agent Systems", by Springer, 2008, pp. 211-223.

The specific module 120, 130 inserts this recompense value into its validation response message RV. It can also store it in memory in association with the time t of collection of the first measurement data vector.

On receipt of the validation response message RV, the generic detection module 110 extracts the information contained therein. If the message includes a validated attack or failure category different from the one it has detected, it stores the category in association with the vector V1($t$) of first measurement data, instead of the predicted anomaly category CI1($t$).

Advantageously, it updates its supervised learning system ACS1 by adding this new association to the learning set D51, with a view to triggering a new learning phase of the classification model of its system ACS1 at a given date, which may depend in particular on a predetermined learning frequency. If the message comprises a recompense value, the generic detection module 110 can advantageously exploit this to determine a new, more appropriate learning frequency value. Indeed, the generic detection module 110 is configured to maximise its recompense. To do this, it evaluates, over a past period of time and from the recompense values it has received, a rate of positive recompenses. It uses this rate to adjust the learning frequency to a value that will allow it to increase its classification performance more quickly. A high positive recompense rate means that its classification model is converging and becoming mature. In this case, the generic detection module 110 may decrease the frequency of learning. On the contrary, if it obtains a low rate of positive recompenses, it can increase the frequency of learning to take into account the corrections of the specific detection modules 120, 130 more quickly.

Such a validation mechanism between the generic module and the specific detection modules therefore allows the generic anomaly detection module 110 to strengthen and improve its performance over time.

Back to FIG. 2A, once the validation of the anomaly class has been completed, the sub-module DEC 150 decides on a processing action to be initiated. The purpose of this sub-module 150 is to react when an anomaly of the attack and/or failure type is detected in the communication network RC. Such a processing action will correct or at least moderate the impact of this anomaly on the operation of the network. Classically, the sub-module DEC implements a decision technique based on the execution of rules defined for example in a > policy of the network operator or in a reinforcement or optimisation model. For example, if a failure is detected in connection with an overload of virtualised network functions, one processing action can be to migrate that function to another virtual machine or to rescale it, that is to change its configuration to increase its processing power. If a congestion-type failure is predicted in the near future, a processing action may consist of load rebalancing. If the detected failure is with a network antenna that is no longer functioning, a processing action could be to ask another antenna to take over. In the event of a detected attack, a processing action may be to disconnect the infected item or items of equipment from the network, inform the firewall and the intrusion detection system of the identity of the infected items of equipment and finally update the encryption keys to prevent attackers from intercepting sensitive data exchanged between an Intrusion Detection System (IDS) and an Intrusion Prevention System (IPS). It is noted that the processing action may be implemented by the device 100 directly or indirectly, by means of another item of equipment of the network that the device 100 notifies of the decision taken or only of the anomaly detected through the sub-module DEC. In other words, the device 100 alerts and/or decides and/or acts.

Advantageously, the device 100 that has just been described thus implements the detection method according to the invention that will be detailed below in relation to FIG. 3.

In relation to FIG. 3, the steps of the anomaly detection method, implemented at the first module 110 of the detection device 100 according to an embodiment of the invention, are now described.

In a step 30, a plurality of first measurement data representative of abnormal resource usage of said network at the item of host equipment EH is obtained. This data is associated with a given time t and has been collected in the communication network RC over a predetermined period of time by various probes or monitoring functions in the network which transmit said data to the device 100. Advantageously, a vector $V1(t)$ of first measurement data is formed. As previously described, this is so-called common measurement data, as it is relevant for the detection of any type of anomaly, whether it is an attack or a failure. It is associated with time t and an $ID_H$ identifier of the host 20.

In 31, an anomaly category C11 is predicted using the first supervised learning system ACS1. It was previously trained with a learning dataset comprising pairs associating pluralities of first measurement data with anomaly categories. Advantageously, it is able to predict at least one of the following three categories:
the presence of an attack anomaly,
the presence of a failure anomaly, and
an absence of anomalies.

As mentioned earlier, it can also predict two distinct anomaly categories for a single input vector $V1(t)$. Notably, it can predict that the anomaly detected at time t is both a failure and an attack. For example, the attack is in progress at time t and the failure is expected in the near future, due to the ongoing attack.

In 32, it validates the predicted category by issuing a validation message DV to the second attack detection module 120 and/or to the third failure detection module, according to the predicted failure category. Indeed, the supervised learning systems ACS2 and ACS3 of the specific modules 120, 130 converge more rapidly to a mature state, notably as they each are based on measurement data vectors more specific to the type of anomalies that they detect, which allows their classification system to learn and to converge more quickly. Advantageously, the request DV includes the time t, the vector $V1(t)$, the predicted category CI(t) and the host $ID_H$.

In this respect, it is noted that the validation request can be transmitted immediately or deferred. For example, if the predicted category is no anomaly, the validation request can be temporarily stored in memory and a grouped request for validations can be sent after a predetermined time period. In this case, it involves validating the fact that no anomaly was to be detected over this time period. One advantage is to avoid generating too much message traffic.

On the other hand, as soon as the category predicts the presence of an anomaly, the sending of the validation request message is preferentially triggered immediately, so as not to waste unnecessary time before triggering a processing action.

On receipt 33 of a response RV validating the presence of an anomaly, of the attack and/or failure type, an action for processing the anomaly is decided in 34, then a command for triggering this processing action is transmitted in 35 to the actuator device 200.

At this stage, several cases are considered:
a) the predicted category is a presence of attack and/or failure, which is confirmed by the second detection module 120 and/or the third detection module 130;
b) the predicted category is a presence of an attack and/or failure, which is refuted by the second detection module 120 and/or the third detection module 130;
c) the predicted category is an absence of anomalies and the absence of attack and failure is confirmed by the second detection module 120 and/or the third detection module 130;
d) the predicted category is an absence of anomalies and is refuted by at least one of the two specific detection modules 120, 130, which has detected an attack and/or failure at time t.

It is understood that only cases a) and d) correspond to the presence of validated anomalies that justify triggering a processing action.

In relation to FIG. 4, the steps of the anomaly detection method, implemented respectively by the attack 120 and failure 130 detection modules according to an embodiment of the invention, are now described.

In 40, a plurality of second measurement data representative of an attack on resources of said network is obtained at time t for the time of host equipment EH associated with the identifier $ID_H$. A vector of second, respectively third, measurement data $V2(t)$, $V3(t)$ is formed. This vector is presented in 41 at the input to the second, respectively third, classification model ACS2, ACS3 previously trained to provide at the output a prediction of a category of attack, respectively failure, from among several categories comprising at least one category representative of a presence of attack, respectively failure, and a category representative of an absence of attack, respectively failure. Advantageously, the category of attack belongs to a group comprising at least a first type of attack, for example DoS, a second type, for example Botnet, and a third type, for example fuzzing threat. It should be noted that each of these attacks may be alternatively covered by a separate attack category at the level of the ACS2 classification model, or that other types of attacks may be considered. Respectively, the failure category belongs to a group comprising at least a first type of failure, for example a congestion in the network, a second type of failure, for example an accessibility problem and a third type of failure, for example a drop call. Its automatic classification model ACS2, ACS3 has previously been trained using a second, respectively third, set DS2, DS3 of learning data comprising pairs associating a vector of second, respectively third, measurement data collected at a given time, with a label, that is the category of attack, respectively of failure, to be associated with this vector.

It is assumed that the vector $V2(t)$, respectively $V3(t)$, has led to the prediction in 31 of the category $CI2(t)$, respectively $CI3(t)$.

At this point, it is understood that the specific detection modules 120, 130 have the function of reinforcing the anomaly classification model of the generic detection module 110. Their classification models are assumed to have reached higher levels of performance and maturity more rapidly than the generic module 110.

In 42, a validation request message DV is received from the first anomaly detection module 110. As previously described, this message includes at least the first measurement data vector $V1t$ ( ) the predicted anomaly category $CI1(t)$, the time t and the identifier $ID_H$ of the host equipment in the vicinity of which the data collection was made. For example, the category $CI1(t)$ submitted for validation corresponds to the presence of attacks, respectively failure. The second module 120 preferentially predicts a category of attack using its classification model upon receiving the validation request from the module 110. Alternatively, it searches in memory for its prediction results associated with time t and the identifier $ID_H$ and compares in 43 the category $CI2(t)$ it predicted with the one it received $CI1(t)$. If there is a match, it responds in 44 by validating the prediction of the first module. Otherwise, it invalidates the prediction of the first module and inserts in its response message the category $CI2(t)$ that it has itself predicted, as a correction. As mentioned above, it can advantageously determine a recompense value R (t), which it also inserts into the response message. Thus, the response message RV includes the time t, the first data vector $V1(t)$, the host equipment identifier $ID_H$, the corrective attack category $CI2(t)$ and, optionally, the recompense value R (t).

In the embodiment described here, advantageously in 45, an information message IF is transmitted by the second module 120 to an attack detection module 120' of an anomaly detection device 100' belonging to a network neighbourhood of the detection device 110. Network neighbours are those network devices that have a direct connection, that is a single-hop, to the device 100. For example, data between the modules 120, 120' of the neighbouring detection devices 110 and 110' is exchanged by means of API software interfaces ("Application Programming Interfaces") based on a REST software architecture (for "Representational State Transfer") or on the implementation of a software platform or data flow communication bus of the Kafka type.

The data contained in such an information message is intended to be injected into the learning set of the recipient specific detection module for its next learning phase. One aim of this information transfer is to enrich the learning set of neighbouring anomaly detection devices by strengthening the models of their specific detection modules.

Thus, according to the invention, several anomaly detection devices located at different points of the communication network RC are interconnected to mutually reinforce their prediction models.

In relation to another embodiment of the invention shown in FIG. 5, a fault management system S comprising a plurality of fault detection devices $100_1$, $100_2$ of the communication network RC and a fault detection coordination device 300 connected to the devices $100_1$, $100_2$ is now described. Such a device 300 is configured to coordinate the actions of processing anomalies detected by the different anomaly detection devices $100_1$, $100_2$ and to reinforce the classification models of each. For this purpose, it is equipped with its own attack and failure detection device 310, which may be, for example, an anomaly detection device according to the invention, as just described in relation to FIGS. 2A and 2B, or may comprise an independent attack detection device and failure detection device according to the prior art. In both cases, it relies on a measurement data vector collected in the communication network RC by various probes or network monitoring functions that transmit said data to the device 310. Advantageously, it also comprises a validation module 320, validation VALID, able to receive from at least one requesting anomaly detection device 100*i* with i being an integer between 1 and I, I being the number of anomaly detection devices supervised by the device 300, an external validation request message DVE comprising at least one category of attacks $CI2(t)$, respectively failures $CI3(t)$ detected by said requesting anomaly detection device, to validate the category of attacks, respectively failures received and to transmit a validation response message RVE to the requesting anomaly detection device. Finally, it comprises a module 330, DEC for deciding and triggering a processing action with at least one actuator device 200. Advantageously, it also comprises a memory 340 wherein it stores measurement data, the learning data sets of the classification model or models implemented by its internal anomaly detection device, etc.

Such a coordination device 300 may be integrated into a node device of the network or, when the network is virtualised, hosted in a virtual machine implementing the physical resources of such a node device.

Advantageously, the device 300 implements an anomaly detection coordination method according to the invention, which will now be described in relation to the flowchart of FIG. 6.

In 60, at least one anomaly category CIC (t) is detected from a vector VC (t) of measurement data associated with time t by the coordination device 300.

In 61, it receives an external validation request message DVE from the second module 120 respectively the third module 130 of an anomaly detection device 100₁, 100₂, comprising a measurement data vector V2(t) respectively V3(t) associated with the time t, the identifier of a host equipment $ID_H$ at the level of which the use of resources is characterised by this measurement data vector, a category of attacks CI2v (t) and failures CI3(t) respectively detected, and a processing action A1(t). Advantageously, this category of attacks respectively failures was previously validated and, if necessary, corrected by one of the specific modules 120, 130 of the requesting anomaly detection device.

In 62, the coordination device 300 compares the received category CI2(t), CI3(t) with the one that its own anomaly detection device 310 has itself predicted CIC (t) in 60 upon reception of the measurement data collected at time t or it triggers an anomaly detection upon receipt of the validation request message received from the device 100, based on its own measurement data vector VC (t). This measurement data vector may have some or all of its data in common with the vector V1(t). If there is a match, it issues a response message in 63 which validates the category of attacks respectively failures detected by the device 100i and possibly the processing action A1(t). It may also include a corrective action AS(t) instead of action A1(t). Otherwise, the response message RS issued includes the category CIC(t), instead of the category CI2(t), CI3(t) and a corrective processing action AS(t).

Advantageously, the response message RVE also includes a recompense value RS (t) which may be determined by the coordination device 300 using a technique similar to that discussed above for the anomaly detection device 100.

Advantageously, in an embodiment of the invention, the device 300 manages a plurality I, with I an integer greater than or equal to 2, of anomaly detection devices 100i and implements a determination of a utility function of each anomaly detection device 100i. To this end, device 300 proceeds in the following manner.

The respective attack detection modules 120i of each of the anomaly detection devices 100i are modelled as a parameter $$\psi_i^{Attacks} = \{\gamma, \delta, \theta\},$$

where i is the index of the anomaly detection device 100i that communicates directly with the coordination device 300, $\gamma = \{\gamma_1, \ldots, \gamma_m\}$ a measurement data vector corresponding to the second measurement data) that the attack detection module uses to monitor its target (item of host equipment EH in the example considered in FIG. 1) and m is the number of measurement data of the input vector $\gamma$.

Note that this number m can vary over time as computer and network security experts may add new relevant measurement data to the measurement data vector and/or remove measurement data that has become obsolete. The attack category $\delta = \{Normal, Attack 1, Attack 2, \ldots, Attack J\}$ corresponds to the output of the classification model of the attack detection module 120i, where J is the total number of attack types that can be detected by the module 120i under consideration. In the illustrative example considered here, three types of attacks are considered as mentioned above, namely DoS denial of service, botnet and blurred threats. $\theta_r(\gamma, \delta)$ (noted here for simplicity $\theta$) designates a recompense value that increases when the attack detection module 120i correctly detects an attack and the attack is confirmed by the coordination device 300. If not, the value of the recompense $\theta_r$ decreases. If the attack detection module persists in producing erroneous attack categories, it will be considered an infected module (by the attacker) and cyber-security experts may decide to replace the module or feed it with a new set of learning data.

Similarly, the failure detection modules 130i are modelled as a parameter $$\psi_i^{Déf} = \{\gamma', \delta', \theta'\}$$

wherein $\gamma' = \gamma_1, \ldots, \gamma'_{m'}\}$ corresponds to the vector of third measurement data associated with the target element EH that the failure detection module 130i monitors and uses as input to its classification model, where m' is the number of measurement data contained in that vector. This number can also be updated by the network experts. The failure category $\delta' = \{Normal, Défaillance1, Défaillance2, \ldots, DéfaillanceJ'\}$ corresponds to the output of the classification model of module 130i. J' is the total number of failure types that can be detected by the module 130i under consideration. It can vary over time. For example, the types of failures are a network cell congestion problem, an interference problem, a call rejection, a virtual machine overload problem, a service degradation problem, a packet loss, an interface problem, etc. $\theta'_i(, \delta')$ (noted here for simplicity $\theta'$ designates a recompense value that increases when the module 130i correctly detects a failure and decreases when it does not. If the module 130i persists in providing erroneous detections over a predetermined period of time, the network experts may decide to replace it or to feed it with a new set of learning data.

For example, in the embodiment described herein, the utility value $$U_t^i$$

of the anomaly detection device 100i is calculated as follows:

$$U_t^i = \frac{D_t - (P_t + N_t)}{AF_t}$$

Where $D_t$ is the number of attacks and failures that were correctly detected by the device 100i;

$P_t$ and $N_t$ are respectively the numbers of false positives and false negatives provided by the device 100i with respect to the detections of the coordination device 300; and $AF_t$ is the total number of attacks and failures detected in the communication network RC at time t by the coordination device 300.

Similarly, the coordination device 300 calculates the utility value $$U_t^{'i}$$

of the attack detection module 120*i* and the utility value $$U_t'^{ri}$$

of the failure detection module 130*i* of the device 100*i*.

At each time t considered, the coordination device 300 calculates the utility value $$U_t^i$$

of the anomaly detection device 100*i* and compares the calculated value with that obtained in the previous iteration and updates the recompense value RSi (t) accordingly.

Specifically, the recompense RSi (t) corresponds to the gain value calculated for the specific detection module 120*i*, 130*i* that has validated the anomaly that the coordination device 300 is evaluating. $\theta'_t$ designates the gain value for the attack detection module 120*i* and $\theta''_t$ the gain value intended for the fault detection module 130*i*. The values of $\theta'_t$ respectively $\theta''_t$ increase when $$U_t'^{ri} > U_{t-1}'^{ri} \text{ respectively } U_t''^{ri} > U_{t-1}''^{ri}.$$

At the end of each iteration, the coordination device 300 instructs the attack and failure detection modules 120*i*, 130*i* of the device 100*i* to update their respective classification models. To do this, it selects pairs of vectors of second and third measurement data and categories of attacks, respectively failures, for which the categories of attacks, respectively failures, that it has predicted does not correspond to the one transmitted by the device 100*i* and which would generate for each of these specific modules an increased utility value $$U_t'^{ri} \text{ and } U_{t-1}'^{ri}$$

for each of these specific modules.

Advantageously, the coordination device 300 recursively updates the utility values of the anomaly detection device 100*i* and estimates for the iteration t+1 the optimal values of the measurement data vectors $(\gamma'_{t+1}, \gamma''_{t+1})$ the recompense values $(\theta'_{t+1}, \theta''_{t+1})$ and the corresponding categories of attacks and failures $(\delta'_{t+1}, \delta''_{t+1})$, as follows:

$$U^*_{t+1}(\gamma'_{t+1},\gamma''_{t+1},\delta'_{t+1},\delta''_{t+1})=U_t(\gamma'_t,\gamma''_t,\delta'_t,\delta''_t)+\alpha^* [\theta'_{t+1}+\theta''_{t+1}+\beta^* \max U_t(\gamma'_{t+1},\gamma''_{t+1},\delta'_{t+1},\delta''_{t+1})-U_t (\gamma'_t,\gamma''_t,\delta'_t,\delta''_t) \quad (2)$$

where $\alpha\in]0,1[$ is the learning rate and $\beta\in]0,1[$ is a constant that corresponds to a discount factor. Such a utility function is for example described in the paper by Servin et al., already cited. Naturally, other utility functions can be used, for example by changing the values of the parameters $\alpha$ and $\beta$.

Hence, the coordination device 300 can decide to add new measurement data or replace old measurement data in the measurement data vector V2, V3 collected by the anomaly detection device 100*i*. It transmits them in the response message RS (t) to the validation request received from the device 100*i*, with the category CIC (t) it has predicted, and the recompense value $\theta'_t$ and/or $\theta''_t$ according to the anomaly category. If the class CIC (t) is an attack category, the transmitted information, namely the new measurement data, the class CIC (t) and the recompense $\theta'_t$, is processed and stored by the attack detection module 120*i* of the device 100*i*; if the class CIC (t) is a failure category, the transmitted information, namely the new measurement data, the class CIC (t) and the recompense $\theta''_t$, is processed and stored by the failure detection module 130*i* of the device 100*i*. Of course, several categories CIC(t) may be contained in the response message RS (t), when several anomalies have been detected at time t by the coordination device 300. In this case, the information is passed on to the relevant modules and each receives the recompense value $\theta'_t$, $\theta''_t$ that is for it.

The coordination device 300 can also decide to change a configuration parameter of the supervised learning system of the attack or failure detection module 120*i*, 130*i*, such as a learning rate.

In 64, the coordination device 300 decides on a processing action to trigger to remedy the anomaly detected at time t. It sends a control message to the actuator device 200 located near the item of host equipment EH concerned by the anomaly.

We now consider the particular case of a telecommunications network RC whose architecture is as specified in the new 3GPP 5G standard. In FIG. 7, a slice NS of the network RC was shown. This slice consists of two sub-slices SSL1 and SSL2 which can belong to separate or non-separate administrative entities, such as network service providers. The infrastructure of each sub-slice can be both physical and virtualised. In this example, each sub-slice SSL1, SSL2 comprises two fault detection devices 100$_{11}$, 100$_{21}$, respectively 100$_{12}$, 100$_{22}$ and an actuator device 200$_1$, 200$_2$ according to the invention. The slice NS unit comprises a coordination device 300 according to the invention in charge of coordinating the anomaly detections for the slice NS and the actions for processing these anomalies.

The measurement data is collected continuously or at times determined by the equipment of the physical and virtual infrastructure of the slice NS. Measurement data can be collected from different sources: Key performance indicators (KPIs), alarms, logs. For each sub-slice, an engineering module of the characteristics (not shown) can collect measurement data, monitor it and categorise it into attack measurement data, failure measurement data and measurement data common to the anomaly type (that is attack type or failure type).

Initial Deployment and Learning Phase of an Anomaly Detection Device

The deployment phase consists of the first instantiation of the anomaly detection devices, also called Attack and Failure Prediction agent (AFPA) in the context of a 5G architecture. According to a first option, the learning of each AFPA agent is for example carried out off-line from measurement data collected off-line and then by injecting the trained model into the agent concerned.

According to a second option, it can also be done on-line as follows:

the collected measurement data is stored in a memory, for example organised as a database, which is called a data lake DL. This database consists of three partitions, the first partition for measurement data common to attacks and failures, the second partition for measurement data relating to security attacks and the third partition for measurement data relating to network failures;

in each sub-module (common and specific as described above) of an AFPA agent, an on-line learning phase is implemented to learn a prediction model able to detect and/or predict current or future anomalies/attacks/failures. Thus, three prediction models are formed. The first model is dedicated to anomaly detection using the common characteristics stored in the first partition of the common database DL. The second model is dedicated to attack detection/prediction using the second partition of the database and the third model is dedicated to failure detection/prediction using the third partition of the database DL;

The previous step is carried out successively, sub-slice by sub-slice, in order to learn the behaviour of each sub-slice with a fine view. In parallel, at the NS layer, the coordination device 300 is configured to learn a general anomaly prediction model for the slice NS. It has visibility of all sub-slices SSL1, SL2 of the slice NS and obtains the measurement data obtained by each sub-slice, for example through a measurement data collection mechanism configured at instantiation of the slices.

Execution Phase of an Anomaly Detection Device

The execution phase exploits the anomaly prediction model from the learning phase.

However, as mentioned above, the prediction models can be periodically subjected to new learning phases during the execution phase, so that they continue to evolve interactively and improve their detection accuracy.

The measurement data is preferentially collected on a regular basis from the infrastructure at each sub-slice SSL1, SSL2 by the engineering module of the corresponding characteristics. This measurement data is not labelled. For example, measurement data is collected periodically with a period T in the order of, for example, a few milliseconds. Of course, this period varies according to the context of application of the invention, and the person skilled in the art will be able to adapt this period to this context.

The collected measurement data is saved in the data lake, in the appropriate partition and according to the format of the measurement data vectors used in the learning phase. It should be noted that the measurement data vectors can also be transmitted directly to the anomaly detection devices of the sub-slice without being stored in the data lake. For this purpose, a suitable transfer mode, for example according to a JSON message format and a Kafka communication bus can be used.

Each data vector received is processed by the anomaly detection device which predicts as output an anomaly category according to the anomaly detection method just described in relation to FIGS. 3 and 4. The anomaly prediction model of the generic anomaly detection module 110$i$ is used to predict whether the received vector instance corresponds to normal behaviour or an anomaly. If an anomaly is detected, it also predicts whether it is an attack or a network failure, and possibly, according to its capabilities and configuration, what type of attack or failure is involved. Once the prediction has been made, a validation request message comprising the common measurement data vector and the predicted category is transmitted to at least one of the two specific detection modules 120$i$, 130$i$ depending on the predicted anomaly category. The specific detection module being queried responds by transmitting, as a correction, its own detection result if the category that it has predicted differs from the one that it has received. Optionally, it adds a recompense value. The prediction model of the generic detection module evolves its model according to the response received. In particular, it integrates the pair formed by the vector of first measurement data and the validated category of attacks, respectively failures into its learning data set. It further uses, where necessary, the recompense value to determine a future learning deadline. In this way, its prediction model is strengthened to improve its performance.

In parallel, the attack and failure prediction models of the specific detection modules of the AFPA agent are fed by their neighbours. The specific modules of the neighbouring agents, in the example of FIG. 7 the modules 120$_{21}$, 130$_{21}$ of the agent 100$_{21}$ transmit to the corresponding modules 120$_{11}$, 130$_{11}$ of the agent 100$_{11}$ information messages concerning attacks/failures corresponding to anomaly detections that they have validated.

Conversely, the specific modules 120$_{11}$, 130$_{11}$ of the agent 100$_{11}$ do likewise. In this way, the anomaly detection agents of the same sub-slice mutually enrich their learning databases.

Finally, the attack and failure prediction models of the anomaly detection agents in each sub-slice SSL1, SSL2 are also enhanced by the coordination device 300 of the slice NS. As previously described, the latter indeed receives the detections of attacks/failures (validated internally beforehand) from each of the AFPA anomaly detection agents that it coordinates. Indeed, its role is to ensure that the AFPA anomaly detection agents it manages are reliable and stable. To do this, it relies on its own prediction model, previously trained on a sufficiently large learning dataset that it can be trusted to validate and, if necessary, correct the category received using its own results. Advantageously, the coordination device 300 adds a recompense/penalty to its response to influence the update frequency of the agent's prediction models having required a validation on its part and, in particular, its learning phases. Advantageously, the reliability of the prediction models of the anomaly detection agent may be assessed by the coordination device 300 using the following list of measures provided as an example and in a non-exhaustive manner:

False positive rate or FP;

False negative rate or FN;

Correct classification rate or TCR, that is the sum of true negatives TN and true positives TP over the total number of instances NT: TCR=(TP+TN)/NT;

Accuracy measurement Pr corresponds to the ratio of the number of true positives TP to the sum of true positives TP and false positives FP: Pr=TP/(TP+FP)

Recall measurement Re, measuring the instances of a category that are correctly predicted or true positives (TP) out of the number of instances of that class: Re=TP/(TP+FN)

F1 score, that is a weighted average between the accuracy measurement and the recall measurement, with the best value of the score F1 corresponding to 100% and its worst value to 0%: F1=2·Pr·Re/(Pr+Re);

Prediction error rate, for example for classification, such as mean square error, absolute square error, etc.

These measurements can be applied to learning data in a learning phase using a cross-validation technique (as used by the anomaly prediction model) or to test data.

Furthermore, in the embodiment described here, when it validates an anomaly detected by an AFPA agent, the coordination device 300 alerts its actuator module 330, also called orchestrator, by transmitting to it the ID$_H$ identifier of the item of host equipment or of the relevant virtualisation function, more generally of the target element in the sense of the invention, the associated time t and the category of attack/failure detected. Depending on the notification received, the actuator device 330 decides either to deal with the problem at the level of the slice NS or to command the actuator device $200_1$ to initiate corrective actions at the level of the relevant sub-slice SSL1,SSL2.

To limit the data traffic generated by the flow of validation, alert and processing control messages according to the invention, one option is to group some of these messages into one. For example, the coordination device 300 may aggregate its validation responses to multiple requests received within a predetermined time period from the same anomaly detection agent.

The anomaly management system in a communication network according to the invention just presented is also applicable to a communication network RC compliant with one of the previous generations 2G, 3G, 4G of the 3GPP standard, for example as specified in TS 23002, entitled "Digital cellular telecommunications system (Phase 2+) Universal Mobile Telecommunications System (UMTS); LTE; Network architecture (3GPP TS 23.002 version 12.5.0 Release 12)", published by ETSI, in October 2014. As illustrated in FIG. 8, such a network is organised in a hierarchical architecture consisting of several levels. These hierarchical levels can be defined, for example, according to geographical proximity or by network function or by type of service. The lowest level in the hierarchy, here called the technical level or technology TL, groups together a set of node equipment with a more restricted view than the level immediately above it, here called the regional level or region RL, which groups together several technologies and itself has a more restricted view than the level above it, here called the highest level GL, which groups together several regions. Each upper level GL, RL has at least one anomaly detection agent that reinforces the one of the lower level. More specifically, in the example considered in FIG. 8, the general level comprises a single anomaly detection agent 200G, which reinforces each of the anomaly detection agents $200_{R1}$-$200_{RM}$ of each of the regions M, with M an integer greater than or equal to 2, of the next lower level RL. Next, each of the agents $200_{R1}$-$200_{RM}$ reinforces the anomaly detection agents $200_{T1}$-$200_{TM}$ of the lower level (TL) with which it is associated, with N an integer greater than or equal to 2. In the example shown in FIG. 8, the agent $200_{R1}$ is configured to reinforce agents $200_{T1}$ and $200_{T2}$, which submit their validation requests to it. Within the same level and internally of each agent, the prediction model of the common anomaly detection module 110 of each agent is further reinforced by the predictions of the models of its specific detection modules of attacks 120 and failures 130. The latter communicate with the specific detection modules of the neighbouring agents within the same hierarchical level to inform them each time that they have detected an anomaly and thus mutually reinforce each other.

When an anomaly is detected at a higher level, a processing action can be triggered either by an actuator device at that higher level or, by delegation, by one or more actuator devices at the lower level(s), depending on the category of attacks and/or failures detected.

When an anomaly is detected by an agent at a lower level, it notifies the agent at the higher level and asks it to validate the detection.

More precisely, the lower level (TL level) has the most restricted view, in the sense that the measurement data that it collects is local to the technology. This level focuses on learning the anomaly prediction models of each agent of each technology attached to a region in a distributed manner. For example, measurement data vectors are labelled with a binary category (normal: 0, problem: 1 behaviour). A rapid and lightweight binary learning technique is implemented by each agent $200_{TN}$ to learn the behaviour of each technology for each region.

The second level (RL) has a more general view in the sense that it receives measurement data from its region, through the mechanism of validation of technologies that depends on this region and through the mechanism of information to neighbours, from neighbouring regions. Learning in this level is carried out by region in a distributed manner. The learning is performed by several models that correspond to the prediction models of each of the region agents $100_{R1}$-$100_{RM}$ and is based on the data collected in the region to which it belongs.

The highest level (GL) has a global view of the network in the sense that it receives measurement data from all regions of the lower level through the validation mechanism. Advantageously, its agent 200G is a coordination device according to the invention. At this level, the learning is carried out on data that covers all the technologies in all regions over a large period. The learning is carried out using a robust prediction model such as a Deep Neural Net (DNN) or Deep Reinforcement Learning.

Another example of the hardware structure of an anomaly detection device 100 according to the invention than that shown in FIGS. 2A and 2B is now shown in relation to FIG. 9.

More generally, such a device 100 comprises a random access memory 103 (a RAM memory, for example), a processing unit 102 equipped for example with a processor, and controlled by a computer program Pg1, stored in a read-only memory 101 (a ROM memory or hard disk, for example). At initialisation, the code instructions of the computer program are for example loaded into a random access memory 103 before being executed by the processor of the processing unit 102. The random access memory 103 may also contain vectors of obtained measurement data, the categories of anomalies predicted for these vectors, the category of corrective attack respectively failure transmitted internally by the specific detection module or modules or externally by the coordination device 300. Optionally, it also stores the recompense/penalty value received.

FIG. 9 only shows a particular one of several possible ways of realising the device 100, so that it executes the steps of the method for detecting anomalies in a communication network as detailed above, in relation to FIGS. 3 and 4 in its different embodiments. Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 100 is realised with a reprogrammable computing machine, the corresponding program (i.e. the sequence of instructions) can be stored in a removable (such as, for example, a floppy disk, CD-ROM or DVD-ROM) or non-removable storage medium, this storage medium being partially or totally readable by a computer or a processor.

The various embodiments have been described above in relation to a device 100 integrated into a node or router equipment item 10 connected to the telecommunications network RT, but it may also be integrated into a virtual network function VNF implemented in the communications network RC and hosted by a node equipment of this network.

According to the embodiment variant of the invention illustrated in FIG. 2A, the device 100 is based on the hardware structure of the item of node equipment 10, that in this example has the hardware structure of a computer and more particularly comprises a processor, a random access memory, a read-only memory, a non-volatile flash memory as well as wireless communication means that enable it to communicate with other equipment, via the communication network. The read-only memory is a storage medium compliant with the invention, readable by the processor and having the computer program Pg1 compliant with the invention recorded thereon, comprising instructions for implementing the method for detecting anomalies according to the invention.

Finally, in relation to FIG. 10, an example of the hardware structure of a device 300 for coordinating anomaly detections according to the invention is presented, comprising, as illustrated by the example of FIG. 5, at least one anomaly detection module 310, an anomaly detection validation module 320 and a module 330 for deciding on an action for processing an anomaly validated with one or more actuator devices.

The term "module" can correspond to a software component as well as to a hardware component or a set of hardware and software components, a software component itself corresponding to one or more computer programs or subprograms, or more generally, to any element of a program capable of implementing a function or set of functions.

More generally, such a device 300 comprises a volatile memory 303 (for example, a RAM memory), a processing unit 302 equipped for example with a processor and controlled by a computer program Pg2, representative of the detection, validation and decision modules, stored in a read-only memory 201 (for example, a ROM memory or hard disk). At initialisation, the code instructions of the computer program are for example loaded into a random access memory 203 before being executed by the processor of the processing unit 202. The random access memory 203 may also contain the categories of anomalies detected by the module 310, recompenses/penalties previously assigned to an anomaly detection device 100, etc.

FIG. 10 only shows a particular one of several possible ways of realising the device 300, so that it executes the steps of the method for coordinating the detection of anomalies as detailed above, in relation to FIG. 6 in its different embodiments. Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 300 is realised with a reprogrammable computing machine, the corresponding program (i.e. the sequence of instructions) can be stored in a removable (such as, for example, a floppy disk, CD-ROM or DVD-ROM) or non-removable storage medium, this storage medium being partially or totally readable by a computer or a processor.

The various embodiments have been described above in relation to a device 300 integrated into a node equipment item 30 of the telecommunications network RT, but it can also be integrated into a virtual network function VNF using the physical resources of an item of node equipment of the network.

The invention that has just been described in its different embodiments has many advantages. In particular, the new anomaly management system proposed by the invention, enables a mutualised detection and monitoring of attacks and network failures, from end to end, whatever the architecture of the communications network.

The invention claimed is:

1. A method for detecting anomalies in a telecommunications network, able to affect a target element of the network, wherein the method is implemented by a first anomaly detection module of a device of the network:

obtaining a plurality of first measurement data representative of a resource usage of said network at a given time at a level of said target element;

determining from the plurality of first measurement data at least one anomaly category from a plurality of anomaly categories comprising at least one category representative of a presence of attack, at least one category representative of a presence of a fault and at least one category representative of an absence of anomaly;

sending a request for validation of the determined anomaly category to a second attack detection module and/or to a third fault detection module, depending on the determined anomaly category, said request comprising at least the given time, an identifier of the target element, the determined anomaly category and the plurality of first measurement data; and on receipt of at least one response from the second and/or third module, deciding a processing action to trigger in the network according to the response received.

2. The method for detecting anomalies in a telecommunications network according to claim 1, wherein the method further comprises:

the second attack detection module:

obtaining a plurality of second measurement data characteristic of an attack and representative of a resource usage of said network at said given time at the level of said target element;

determining from the plurality of second measurement data, an attack category, among a plurality of attack categories comprising at least one category representative of a type of attack and at least one category representative of an absence of attack; and sending to the first module a first of at least one validation response to the validation request from the first module, comprising at least the attack category determined by the second module, known as a validated attack category; and the third failure detection module:

obtaining a plurality of third measurement data characteristic of a network failure and representative of a resource usage of said network at said given time at the level of said target element;

determining from the plurality of third measurement data, a failure category, among a plurality of failure categories comprising at least one category representative of a type of failure and at least one category representative of an absence of failure; and sending to the first module a second of the at least one validation response to the validation request from the first module, comprising at least the failure category determined by the third module, known as a validated failure category.

3. The method for detecting anomalies in a telecommunications network according to claim 2, wherein the determination of an anomaly category comprises at least one prediction of said at least one anomaly category by a first classification model and wherein the method implements, upon reception of the validation response or responses from the second and/or third module, an update of a first learning set to train the first classification model used by the first module for the prediction of said at least one anomaly category, with the plurality of first measurement data associated with the validated category of attacks and/or failures received in the validation response or responses, and triggering a learning phase of the first classification model using the updated first learning set.

4. The method for detecting anomalies in a telecommunications network according to claim 3, wherein at least one received validation response further comprises a first recompense valued according to a match of the validated category of attacks, respectively failures, with the anomaly category predicted by the first module, said first recompense having a positive value in case of a match, and a negative value in case of a non-match; and wherein the learning phase of the first classification model is triggered at a time delay depending on the value of the received first recompense.

5. The method for detecting anomalies according to claim 2, wherein following validation of the anomaly category determined by the first module, an information message is transmitted by the second, respectively the third module to a neighbouring anomaly detection device in the communication network, said information message comprising at least the given time, the identifier of the target element, the validated category of attacks, respectively failures and the plurality of second, respectively third, associated measurement data.

6. The method for detecting anomalies according to claim 2, wherein the method implements a reception of an information message from a neighbouring anomaly detection device in the communication network, said message comprising at least a given time, an identifier of a target element, a plurality of second, respectively third, measurement data associated with the given time and a class of attacks, respectively failures detected at the level of the target element, updating a second, respectively third, learning set used to train a second, respectively third, classification model used by the second, respectively third, detection module using the information received, and a triggering of a learning phase of the second, respectively third, classification model using the updated second, respectively third, learning set.

7. The method for detecting anomalies according to claim 1, wherein the method implements:

by the second, respectively third, module:

transmitting to a network anomaly detection coordination device an external validation request comprising at least the category of attacks, respectively failures detected, the plurality of associated second respectively third measurement data, the identifier of the target element and the given time; and receiving an external validation response comprising at least one category of attacks, respectively failures validated by said anomaly detection coordination device.

8. The method for detecting anomalies according to claim 7, wherein the received external validation response further comprises a second recompense having a positive value if the detected category of attacks, respectively failures, corresponds to the category of attacks, respectively failures, detected by the coordination device and a negative value otherwise and updating the second, respectively third, set of learning data by adding the plurality of second, respectively third, measurement data associated with the category of attacks, respectively failures, validated by the coordination device.

9. A method for coordinating the detection of anomalies in a communication network, wherein the method implements, by a network coordination device:

receiving, from at least one anomaly detection device of the network, an external validation request comprising at least one category of attacks, respectively failures, detected by said detection device, a plurality of measurement data characteristic of an attack, respectively a failure and representative of a use of network resources at a given time at a level of a target element of said network;

validating said at least one category of attacks, respectively failures, detected by said detection device, by matching the received category of attacks, respectively failures, with at least one category of attacks, respectively failures, detected by said coordination device at said given time and at the level of said target element; and transmitting to the anomaly detection device an external validation response comprising at least the category of attacks, respectively failures detected by said coordination device.

10. The method for coordinating the detection of anomalies according to claim 9, wherein said external validation response further comprises a recompense having a positive value if the received category of attacks, respectively failures, corresponds to the category of attacks, respectively failures, detected by the coordination device and a negative value otherwise.

11. The method for coordinating the detection of anomalies according to claim 9, wherein the external validation response further comprises a type of measurement data to be added to said plurality of measurement data collected by the anomaly detection device.

12. An anomaly detection device for detecting anomalies in a telecommunications network, wherein the device comprises:

a reprogrammable computing machine or a dedicated computing machine, which is configured to implement a first anomaly prediction module, a second attack prediction module and a third failure prediction module and wherein the first module is configured to:

obtain a plurality of first measurement data representative of a resource usage of said network at a given time at a level of a target element of said network;

determine from the plurality of first measurement data at least one anomaly category from a plurality of anomaly categories comprising at least one category representative of a presence of attack, at least one category representative of a presence of a fault and at least one category representative of an absence of anomaly;

send a request for a validation of the determined anomaly category to the second attack detection module and/or to the third fault detection module, depending on the determined anomaly category, said request comprising at least the given time, an identifier of the target element, the determined anomaly category and the plurality of first measurement data; and on receipt of at least one response from the second and/or third module, decide a processing action of the anomaly to trigger in the network according to the response received.

13. A coordination device for coordinating detection of anomalies in a communications network, comprising:

a reprogrammable computing machine or a dedicated computing machine, which is configured to:

receive, from at least one anomaly detection device of the network, an external validation request comprising at least one category of attacks, respectively failures, detected by said detection device, a plurality of measurement data characteristic of an attack, respectively a failure and representative of a use of network resources at a given time at a level of a target element of said network;

validating said at least one category of attacks, respectively failures, detected by said detection device, by matching the received category of attacks, respectively failures, with at least one category of attacks, respectively failures, detected by said coordination device at said given time and at the level of said target element; and transmitting to said anomaly detection device an external validation response comprising at least the category of attacks, respectively failures detected by said coordination device.

14. The anomaly detection device according to claim 12, wherein the anomaly detection device is implemented in a router equipment of a telecommunications network.

15. A system for managing anomalies in a telecommunications network, wherein the system comprises:

at least one anomaly detection device for detecting anomalies in the telecommunications network, wherein anomaly detection device comprises a reprogrammable computing machine or a dedicated computing machine, which is configured to implement a first anomaly prediction module, a second attack prediction module and a third failure prediction module and wherein the first module is configured to:

obtain a plurality of first measurement data representative of a resource usage of said network at a given time at a level of a target element of said network;

determine from the plurality of first measurement data at least one anomaly category from a plurality of anomaly categories comprising at least one category representative of a presence of attack, at least one category representative of a presence of a fault and at least one category representative of an absence of anomaly;

send a validation request for a validation of the determined anomaly category to the second attack detection module and/or to the third fault detection module, depending on the determined anomaly category, said validation request comprising at least at the given time, an identifier of the target element, the determined anomaly category and the plurality of first measurement data; and on receipt of at least one response from the second and/or third module, decide a processing action of the anomaly to trigger in the network according to the response received; and at least one anomaly detection coordination device for coordinating detection of anomalies in the telecommunications network, each coordination device comprising a reprogrammable computing machine or a dedicated computing machine, which is configured to:

receive, from the second attack detection module and/or the third fault detection module of at least one of the at least one anomaly detection device of the network, an external validation request comprising at least one category of attacks, respectively failures, detected by said anomaly detection device, a plurality of measurement data characteristic of an attack, respectively a failure and representative of a use of network resources at a given time at a level of a target element of said network;

validating said received at least one category of attacks, respectively failures, detected by said anomaly detection device and received with the external validation request, by matching the received at least one category of attacks, respectively failures, with at least one category of attacks, respectively failures, detected by said coordination device at said given time and at the level of said target element; and transmitting to said anomaly detection device, from which the external validation request was received, an external validation response comprising at least the category of attacks, respectively failures detected by said coordination device.

16. The system for managing anomalies according to claim 15, wherein said telecommunications network comprises at least one slice comprising a coordination device of the at least one anomaly detection coordination device, said slice being configured to support a communication service for a given customer and comprising at least two sub-slices managed by separate administrative entities, each sub-slice comprising at least one target element, and an anomaly detection device of the at least one anomaly detection device, which is configured to detect anomalies at said at least one target element of said sub-slice.

17. The coordination device according to claim 13, wherein the coordination device is implemented in a router equipment of a telecommunications network.

* * * * *